United States Patent
Lee et al.

(10) Patent No.: US 7,124,207 B1
(45) Date of Patent: Oct. 17, 2006

(54) I2O COMMAND AND STATUS BATCHING

(75) Inventors: Timothy Vincent Lee, Cary, NC (US); Timothy Chin-Cheung Ng, Cary, NC (US)

(73) Assignee: Adaptec, Inc., Milpitas, CA (US)

( * ) Notice: Subject to any disclaimer, the term of this patent is extended or adjusted under 35 U.S.C. 154(b) by 280 days.

(21) Appl. No.: 10/640,936

(22) Filed: Aug. 14, 2003

(51) Int. Cl.
*G06F 3/00* (2006.01)
*G06F 9/30* (2006.01)

(52) U.S. Cl. .................. 710/5; 710/4; 710/52; 712/205; 712/206

(58) Field of Classification Search ............... None
See application file for complete search history.

(56) References Cited

U.S. PATENT DOCUMENTS

| | | | |
|---|---|---|---|
| 5,337,413 A | * | 8/1994 | Lui et al. .................. 710/2 |
| 5,717,956 A | | 2/1998 | Shinosaka et al. |
| 5,790,887 A | * | 8/1998 | Brech ....................... 710/5 |
| 5,915,092 A | | 6/1999 | Morita et al. |
| 5,983,292 A | * | 11/1999 | Nordstrom et al. .......... 710/54 |
| 5,983,337 A | | 11/1999 | Mahalingaiah et al. |
| 6,065,096 A | | 5/2000 | Day et al. |
| 6,105,080 A | | 8/2000 | Holt et al. |
| 6,154,789 A | | 11/2000 | Grieff et al. |
| 6,226,695 B1 | * | 5/2001 | Kaiser et al. ............... 710/5 |

\* cited by examiner

*Primary Examiner*—Kim Huynh
*Assistant Examiner*—Eron Sorrell
(74) *Attorney, Agent, or Firm*—W. David Sartor; Beusse Wolter Sanks Mora & Maire, P.A.

(57) ABSTRACT

A method and system for batching commands and status information between a host computer and an adapter installed on the host computer. The method for command batching includes the host storing command pointers, each command pointer pointing to a command in an array, and providing an array pointer to the array. When a predetermined threshold of stored commands has been reached, the host can deliver a multitude of commands via the array pointer with a single bus access. A method for status batching includes transferring command statuses from the adapter to the host computer and providing a pointer to the transferred statuses. When a predetermined threshold of statuses has been reached, the adapter interrupts the host computer once to fetch the pointer and the host can then read the statuses without requiring any more bus interrupts.

7 Claims, 3 Drawing Sheets

I2O COMMAND AND STATUS BATCHING

FIELD OF THE INVENTION

The invention relates to I/O interfacing, and in particular, to batching of I/O commands and statuses in I2O compatible interfaces.

BACKGROUND OF THE INVENTION

Computing systems generally include a system bus for inserting input/output (I/O) interface circuits to connect the computing system to peripheral I/O devices. Such circuits are often known as host adapters, I/O interfaces, or I/O processors (IOP). The current trend for high-end networking and storage technology is pushing more functionality down to a low level driver, while at the same time demanding higher performance. To meet these demands, hardware vendors have developed intelligent host adapters that contain their own I/O controller circuits and associated processing capability for processing I/O transactions such as for RAID controllers. Intelligent host adapters may include significant local processing power and local memory use for processing host computer I/O requests and for controlling the attached I/O devices. New I/O architectures have been developed incorporating intelligent host adapters to relieve the host of interrupt intensive I/O tasks greatly improving I/O performance and high bandwidth applications, such as client server processing.

One such I/O architecture is known as intelligent I/O (I2O). The I2O standards are published and maintained by an industry group known as the I2O Special Interest Group. The I2O Standard, Version 2, can be found at "www.intelligent-IO.com." The I2O interface standard defines layers of an interface structure between, for example, the host computer system and an intelligent host adapter. The standard simplifies the device driver modules for I/O interface devices by isolating device dependencies in the modules. Driver modules written in conformance with the standard are also more portable among a variety of system architectures and operating systems. The I2O specification partitions the device driver into a first portion that contains all the Operating System (OS) specific code and a second portion containing all the hardware specific code unique to a particular class of I/O device. Accordingly, OS vendors need only produce one OS specific module for each class of an I/O device. Similarly, hardware vendors only need to produce a single version of the hardware device modules for a specific I/O adapter. In this manner, the I2O standard provides an I/O device driver architecture that is independent of both the I/O device and the host operating system.

A typical I2O driver consists of an operating system specific module (OSM) and a hardware device module (HDM). The OSM and the HDM are autonomous and can perform independent tasks without sending data over a system I/O bus in the host computer. An HDM and OSM interface with each other through a communication system comprised of a message layer and a transport layer. This communication system is similar to a connection oriented networking protocol. For example, in a connection oriented network protocol, two parties interested in exchanging information utilize a message layer to set up a connection and to exchange control information and data. In the I2O model, the message layer sets up a communication session between the HDM and the OSM and the corresponding transport layer defines how the HDM and the OSM share information.

In a typical application, when the OSM is presented with a request from the host operating system, it translates the request into an I2O message and dispatches it to the appropriate HDM for processing. When the HDM has completed the request, it dispatches the results back to the OSM by sending a message to the I2O message layer. The host layers in an I2O host system and an I2O intelligent adapter communicate with one another via shared memory data structures. Shared memory is accessible via the common system bus interconnecting the communicating nodes, for example, the host system and the intelligent adapter. Specifically, the I2O interface defines a number of standard queues and other data structures commonly accessible in memories shared between the respective processors and the host system and the intelligent adapters.

The peripheral component interconnect (PCI) bus has become a popular system bus for direct connection of host adapters to the host system. In such a system, the host system may directly access the local memory of the host adapter. Similarly, the host adapter may directly access the memory of the host system. Using such direct access to one another's memory, it is common to use direct memory access (DMA) in host adapters to perform the transfers of data with minimal overhead imposed on the general purpose processing power both the host system and the host adapter.

The I2O standard includes four circular queues for messaging: 1) an inbound free queue, 2) an inbound post queue, 3) an outbound free queue and (4) an outbound post queue. The inbound queues allow the host to obtain a pointer to a buffer by reading the inbound free queue and writing the message to this buffer. Once the message is written, the pointer to the buffer is written to the inbound post queue. Conversely, the outbound queues are used for the adapter's firmware to deliver returned message status to the host in a similar fashion as the inbound queues. For example, when the host needs to deliver a command to the adapter, the host sets up the command in the host's memory and then writes the command's address to the inbound post queue. In this technique, the adapter device driver immediately writes the pointer of this command to the inbound post queue requiring the device driver to access the PCI bus for each individual command delivery. In a system where multiple adapters are installed, the time the device driver spends in kernel privileged time may be extended due to other bus masters contending for access to the PCI bus.

Upon detecting a write to the inbound post queue, the adapter interrupts the adapter firmware. The firmware in turn pops the command address from the inbound post queue, sets up a DMA channel to fetch the command and processes the command. When the command is processed, the commands two status bytes and the command's ID are pushed onto the outbound post queue. When the adapter detects the availability of valid entries in the outbound post queue, the adapter sets a status bit in the outbound interrupt status register and sends an interrupt to the host. The host interrupt service routine (ISR) reads the status from the outbound message queue to process the status and thereby completes the cycle of command and status returned. The ISR can keep reading the outbound post queue until it receives a value of 0xffffffff that indicates the depletion of the outbound post queue's valid entries. Although multiple statuses are in the outbound post queue, the device driver's ISR must access the PCI bus and read the status from the outbound queue once per each status. With multiple adapters on a system, the device driver is contending with all other adapters for PCI bus resources. While the ISR is waiting for bus access, the ISR is tying up host CPU resources for servicing the ISR. In addition, due to speed mismatches between the host and the adapter, the ISR may read the first status and process the status before the adapter can replenish its staging status register from the status queue in local memory. During replenishment of the status register, the ISR is informed with an empty status (0xffffffff) and exits the routine. Once the status register is replenished after the ISR has exited, the bus needs to be interrupted again, requiring another ISR which may result in interrupt thrashing until the status queue is cleared.

SUMMARY OF THE INVENTION

A method of batching commands between a host computer and an adapter installed on a host computer system bus is described herein as including storing respective command pointers to each of a multitude of commands in an array. The method also includes providing an array pointer to the array. The array pointer includes a data value corresponding to a number of respective command pointers in the array. The method further includes delivering the array pointer to the adapter, accessing the number of respective command pointers in the command array corresponding to the data value in the array pointer, and then fetching the commands corresponding to each command pointer accessed.

In addition, a method for batching command statuses between a host computer and an adapter installed on a host computer system bus is described herein as including transferring a multitude of command statuses from the adapter to a predetermined memory address in the host computer. The method also includes providing a pointer to the plurality of command statuses in the host computer. The pointer includes a data value corresponding to a number of respective command statuses in the transferred plurality of command statuses. The method further includes interrupting the host computer to fetch the pointer, and reading, starting at the predetermined memory address, the number of respective command statuses corresponding to the data value in the pointer.

BRIEF DESCRIPTION OF THE DRAWINGS

The features and advantages of the present invention will become apparent from the following detailed description of the invention when read with the accompanying drawings in which.

Figure 1:
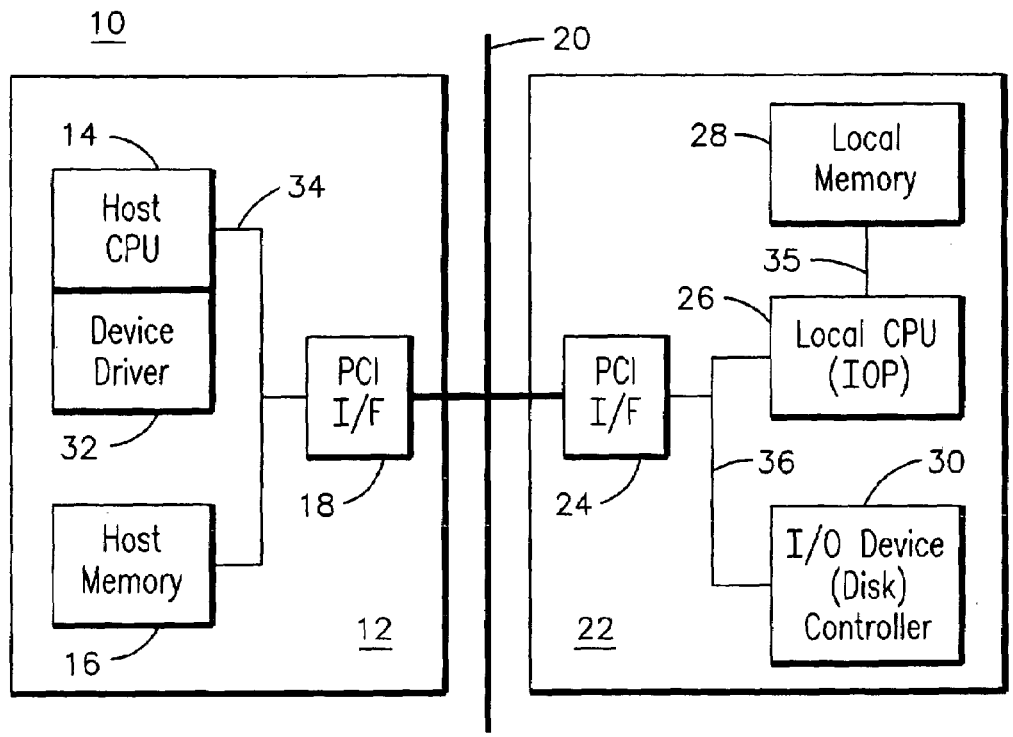
FIG. 1 illustrates a block diagram representation of a system for batching commands and statuses between a host computer and an adapter.

In certain situations, for reasons of computational efficiency or ease of maintenance, the ordering of the blocks of the illustrated flow chart and elements in the illustrated state diagram could be rearranged by one skilled in the art. While the present invention will be described with reference to the details of the embodiments of the invention shown in the drawing, these details are not intended to limit the scope of the invention.

DETAILED DESCRIPTION OF THE INVENTION

FIG. 1 illustrates a block diagram representation of a system 10 for batching commands and statuses between a host computer 12 and an adapter 22, such as an I/O interface. The host computer 12 and the adapter 22 can be connected via a common peripheral interface bus 20, such as a PCI compatible bus. However, those skilled in the art will recognize that any of several computer interface busses may be used in conjunction with the system and associated methods of the present invention. The host computer 12 may include a host CPU 14, a host memory 16, and a peripheral interface module 18, such as a PCI compatible interface, connected via an internal bus 34. The host computer 12 may also include a device driver 32 for communicating with the adapter 22. The adapter 22 may share the basic architectural design of the host computer 12 in that it may comprise a local CPU 26 and a local memory 28 connected via an memory bus 35, and an I/O device controller 30, such as a disk controller, connected via an internal bus 36. The CPU 26 and the I/O device controller 30 may communicate via an interface bus 20 through a peripheral interface module 24 such as PCI compatible interface. Accordingly, the host CPU 14 can communicate with the local CPU 26 on the adapter 22 via the common interface bus 20. Typically, the adapter 22 processes I/O requests received from the host system 12 via common bus 20. The adapter 22 may be connected to external IO peripheral devices (not shown) through the I/O device controller 30 and may perform I/O operations for the benefit of, and at the request of, host computer 12.

In an aspect of the invention, adapter 22 is intelligent in that it possesses significant local processing power to perform I/O processing with a minimum of overhead imposed on the host computer 12. Such intelligent host adapters are often utilized for host interconnection to high performance networks or storage systems such as RAID storage configurations as well as other applications apparent to those skilled in the art. Communications between the host computer 12 and the adapter 22 may be performed according to the intelligent I/O (I2O) standard as is known in the art and may be implemented using an IOP 26. The I2O standard uses messaging queues for command and status delivery. In particular, the I2O standard specifies an inbound post queue for writing a pointer to a buffer containing, for example, an I/O command. The I2O standard also specifies an outbound queue for writing a pointer to a buffer containing status, such as a status in response to a received command. Typically, a pointer written into either the inbound queue or the outbound queue only points to one command or one status. Accordingly, each time a command is transferred to the adapter 22 or status is posted to the host computer 12, the system bus 20 must be arbitrated to process each transfer. The inventors have innovatively recognized that by grouping commands or statuses together, and then posting a pointer in the appropriate queue pointing to the corresponding group of commands or statuses, then only one bus arbitration is required for transferring the group of commands or statuses, thereby saving multiple bus arbitration steps that would conventionally be required when processing one command or status per pointer.

Figure 2:
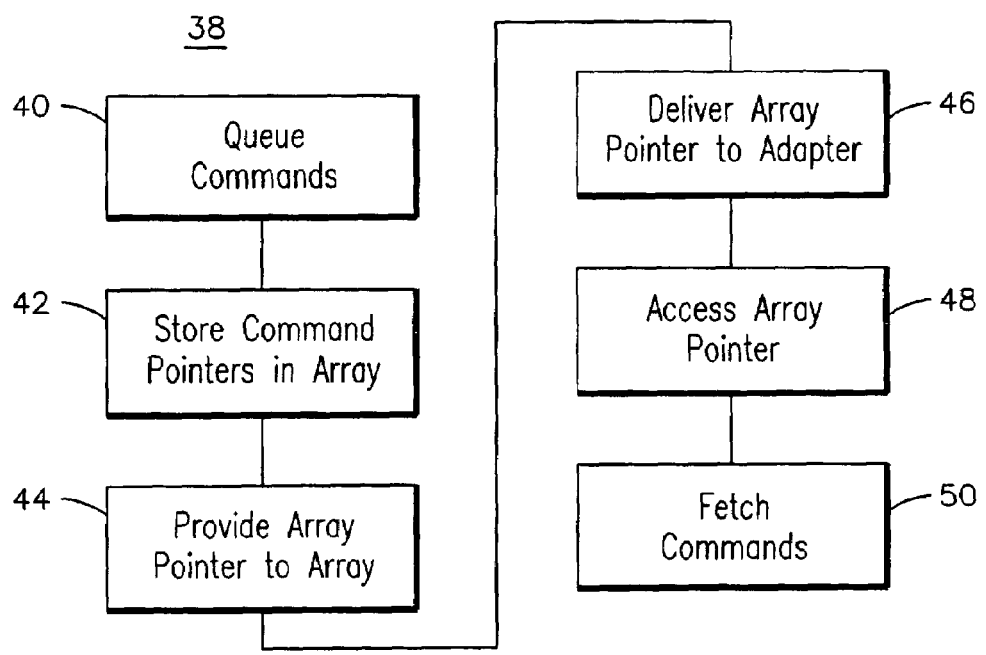
FIG. 2 is a flow chart illustrating a method of command batching.

FIG. 2 is a flow chart illustrating a method of command batching between a host computer 12 and an adapter 22. In a conventional I2O implementation, the device driver 32 sets up a command to the adapter 22 in the host memory 16. The device driver 32 then writes a pointer to this command to the inbound post queue. This requires the device driver 32 to access the peripheral interface bus 20 for each command pointer delivered to the adapter 22. In a computer system 12 where multiple adapters are installed, the device driver 32 must compete with the other adapters on the bus 20 for access to the bus 20. Accordingly, the device driver 32 may have to wait for a period of time before getting access to the bus 20 to deliver the pointer to the command.

Using the batching method 38 as shown in FIG. 2, commands may be batched to enable multiple commands to be delivered to an adapter 22 using only a single access of the interface bus 20. As the host CPU 14 issues commands to the adapter 22, the commands may be queued and stored 40, for example, by the device driver 32 in a command queue in host memory 16. It is not necessary that the commands be stored sequentially, provided the storage location of each command is associated with the command. Each time a command is stored in the command queue, the device driver 32 stores a command pointer, pointing to the stored command, in the command pointer array 42. The device driver then provides a command array pointer pointing to the command pointer array 44. For example, the command array pointer may point to the starting address of the command pointer array. The starting address of the command pointer array may be a predetermined, agreed upon address, or may be established dynamically each time a new group of commands are issued by the host CPU 14. The command array pointer may comprise a data value corresponding to the number of respective command pointers in the array. For example, if the host computer 12 issues ten commands to the adapter 22, ten command pointers, each pointing to a respective command, will be stored in the command pointer array starting, for example, at a predetermined address in host memory 16. The device driver 32 will then provide a command array pointer to the predetermined address that includes a data value of 10, indicating that there are ten command pointers in the command pointer array, and a corresponding number of commands associated with each of the command pointers. In addition, the command array pointer may also include the starting address of the command pointer array. In an embodiment, the command array pointer may take the format as shown in Table 1 below:

TABLE 1

Command Array Pointer Format

| 31 | 4 | 3 | 0 |
|---|---|---|---|
| Address of Command Pointer Array | | Number of Commands | |

Table 1 illustrates a 32-bit pointer wherein the upper 28 bits include the address of the command pointer array. The lower four bits include the number of commands pointers in the command pointer array and, correspondingly, the number of commands in the queue. The command array pointer is then delivered to the adapter 22, for example, by posting the array pointer in the inbound post queue 46 by accessing the interface bus 20 in a conventional I2O technique. The device driver 32 may post the command array pointer when a predetermined number of commands have been issued by the host CPU 14. For example, the four bits in the number of commands field in the command array pointer format can define up to sixteen separate commands. Accordingly, the predetermined number of commands issued by the host 12 may be set at sixteen, so that when sixteen commands are issued, the device driver 32 will store sixteen command pointers in the command pointer array and provide a command array pointer to the command pointer array including a data value of sixteen. When the command array pointer is delivered to the adapter 22, the adapter 22 sequentially accesses the number of respective command pointers in the command pointer array 48 pointed to by the command array pointer. The number of commands accessed in this manner corresponds to the data value in the command array pointer indicating the number of command pointers at the command pointer array address. The adapter 22 then fetches the commands corresponding to each of the command pointers accessed 50. The adapter 22 can fetch and store the commands in local memory 28 using, for example, direct memory access (DMA) as is understood in the art, without requiring arbitration of the PCI bus for each transfer of each command. Once the commands are transferred, the adapter 22 can process the commands directly from local memory 28.

To implement the command batching method, a new mode switch command may be required to instruct the adapter 22 to switch from a conventional I2O mode of accessing one command per delivered pointer, to accessing a group of commands per delivered pointer. Table 2 below shows the format of this mode switch command:

TABLE 2

COMMAND BATCH MODE SWITCH FORMAT

| Offset | Values | Description |
|---|---|---|
| 0X00 | 0XE1 | Op Code |
| 0X01 | Don't Care | Command ID assigned by host |
| 0X02 | 0X00 | Reserved |
| 0X03 | 0X04 | Switch into command batching mode after this command |
| 0X04–0X0F | 0X00 | Reserved |

In an aspect of the invention, the host computer 12 insures that the adapter 22 is quiescent before sending the mode switch command. It should be understood by those skilled in the art that the device driver 32 may issue the switch command shown in Table 2 at any time prior to the adapter 22 accessing the command array pointer. For example, the batching mode may only be needed during periods where the host issues many commands to the adapter 32 in a short period of time. In another aspect, a value of "0" in the number of commands field in the command array pointer format as shown in Table 1 may be used to notify the adapter to revert back to the conventional I2O mode. Accordingly, when the value in the number of commands field is 0, a pointer in the I2O inbound post queue is interpreted conventionally as a pointer to a command, not a pointer to an array of command pointers as in the batched mode. This technique allows backward compatibility with legacy systems and can also be used for delivering a single urgent command.

Figure 3:
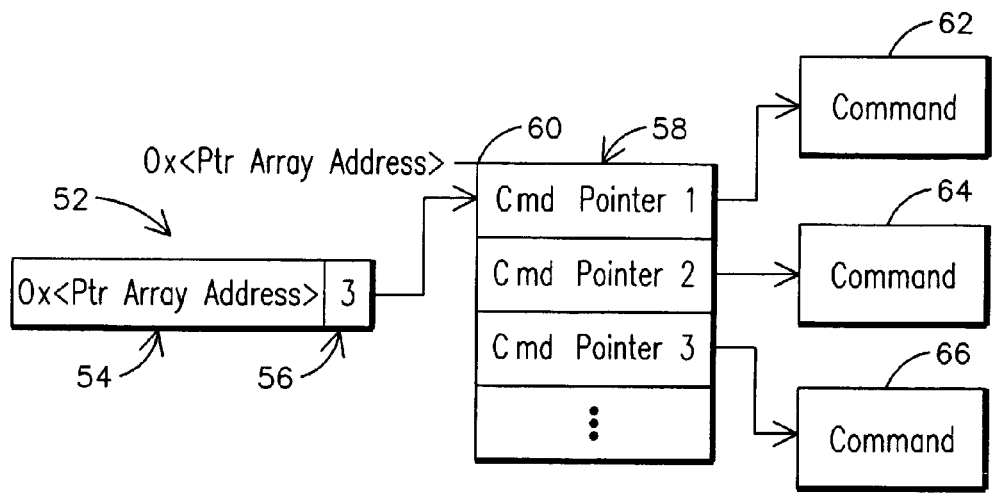
FIG. 3 is diagram of the relationship among data used in a command batching method.

FIG. 3 is a diagram of the relationship among data used in the command batching method. As shown, the command array pointer 52 in the inbound queue includes an address 54 of the command pointer array 58 and the number of command pointers 56 in the command pointer array 58. The address 54 in the command array pointer 52 specifies the starting address 60 of the command pointers array 58. The number of command pointers 56 in the array pointer corresponds to the number of stored commands. As shown in FIG. 3, the value "3" in the array pointer specifies that three command pointers exist in the command pointers array 58 starting at the address of the command pointer array 60. Each of the command pointers points to a respective command 62,64, 66 stored in host memory 16. Accordingly, by reading the command array pointer, the adapter 22 can locate the command pointer array, recognize how many command pointers exist in the command pointer array, and can fetch each of the commands pointed to by the respective command pointers in the command pointer array.

Figure 4:
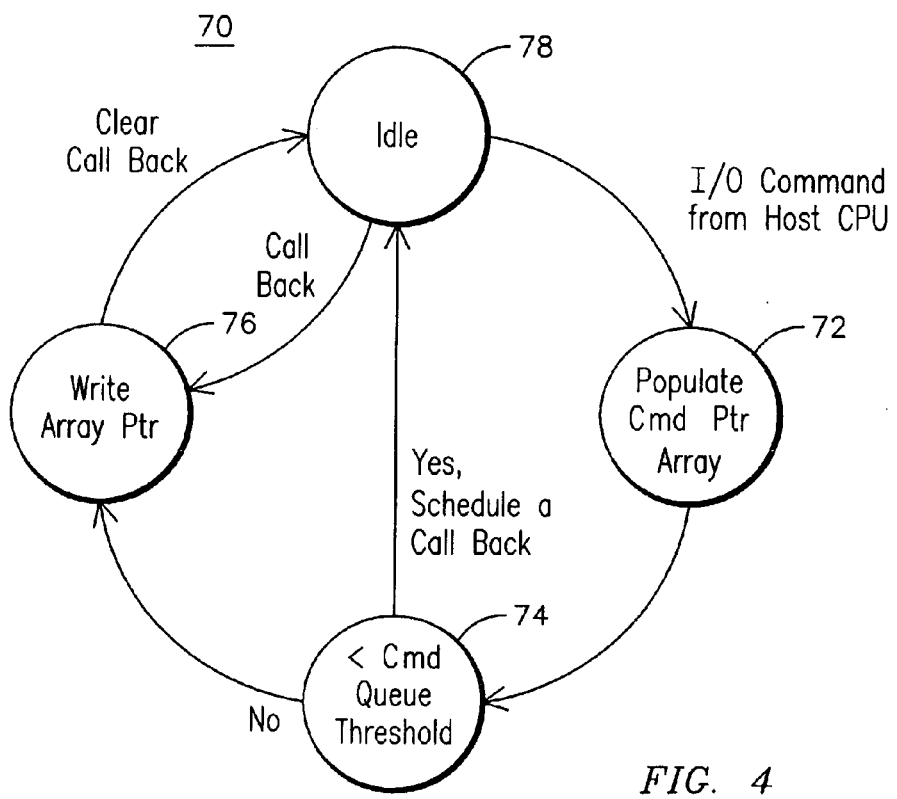
FIG. 4 is a state diagram illustrating an implementation of the command batching method.

FIG. 4 is a state diagram illustrating an implementation of the command batching method. In an aspect of the invention, the device driver 32 operates in accordance with the illustrated state diagram to perform command batching. In particular, FIG. 4 illustrates a call back function to insure that periodic delivery of adapter commands even if the number of commands queued in host memory 16 has not reached a delivery threshold. Initially, the device driver 32 receives a command from the host 12 and populates the command pointer array with the command pointer pointing to the command 72. If the number of command pointers in the command pointer array is less than a queued command threshold 74, then the device driver 32 schedules a call back, or sets a timer and remains idle 78 until another I/O command is issued by the host CPU 14. If the number of commands in the queued threshold 74 is not less than the delivery threshold 74, then the device driver writes the command array pointer pointing to the command pointer array in the inbound post queue 76. The device driver then clears the call back and returns to an idle state 78 awaiting I/O commands from the host. In addition, when a scheduled call back occurs while in idle 78, the device driver writes the array pointer 76 to the inbound post queue, even though the number of command pointers in the command pointer array may be less than the threshold. Accordingly, I/O commands from the host are periodically flushed according to the call back schedule even though the number of commands are less than the command queued threshold, which would normally notify the device driver 32 to write the array pointer to the inbound post queue.

In addition to command batching from the host computer 12 to the adapter 22, the inventors have innovatively recognized that status data provided by the adapter 22 to the host computer 12 may also be batched to improve processing efficiency. In a conventional I2O process, after a command is delivered to the adapter 22, the command's two status bytes and the command's ID are pushed on to an outbound post queue. Upon detecting the availability of valid entries on the outbound post queue, the adapter 22 asserts an interrupt to the host computer 12. The host interrupt service routine (ISR) reads the status from the outbound post queue and continues to read the outbound post queue until it finds a value of 0Xffffffff that indicates the depletion of the outbound post queue's valid status entries. The inventors have innovatively realized that by queuing up statuses internally in the adapter 22, such as by storing the statuses in an array, and transferring the queued statuses to, for example, a predefined memory location in the host computer 12, that calling of a time and resource consuming ISR on the host 12 can be minimized.

Figure 5:
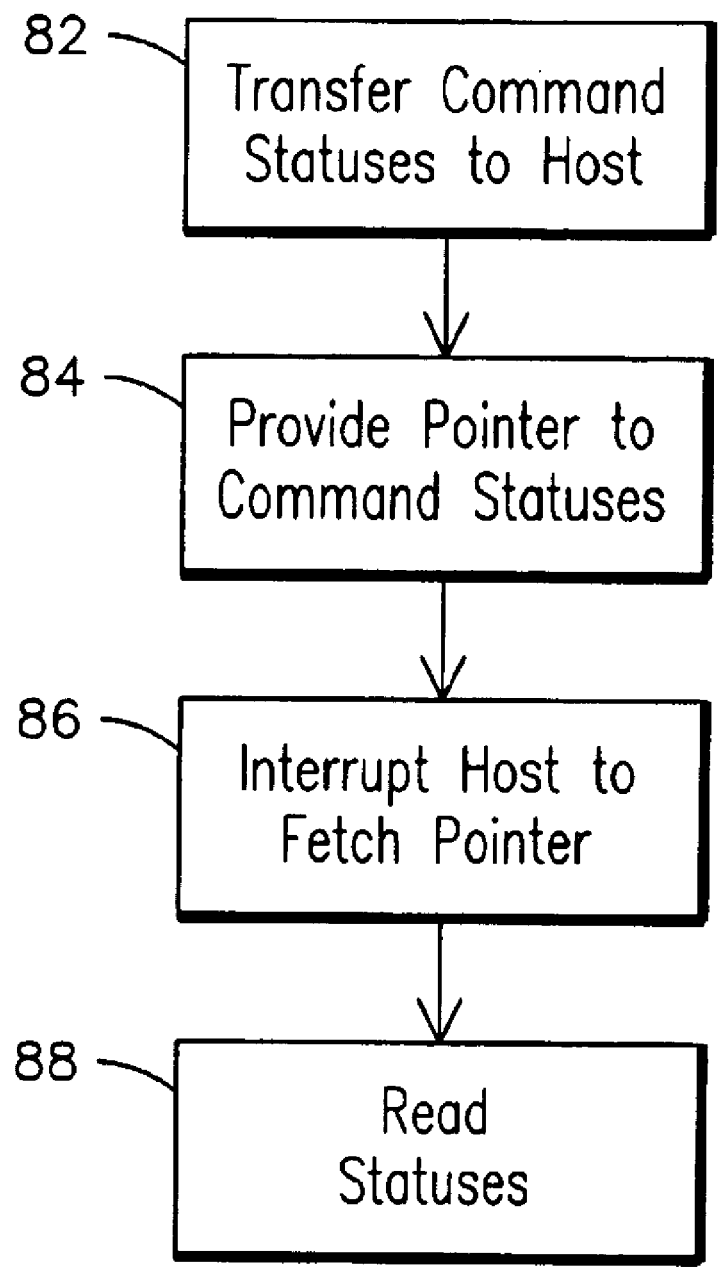
FIG. 5 is a flow chart illustrating a method of status batching.

FIG. 5 is a flow chart illustrating a method of status batching. As depicted in FIG. 5, the method for batching command statuses 80 between the host computer 12 and an adapter 22 installed on the host computer system 20 includes transferring a plurality of command statuses 82 from the adapter 22 to a predetermined memory address in the host computer 12 82. In an aspect of the invention, the command statuses are queued in local memory 28 of the adapter 22 as requested commands are executed by the adapter 22. The queued plurality of command statuses can be transferred when a command status threshold has been reached, such as when a predetermined number of command statuses have been queued. In an aspect of the invention, the step of transferring a plurality of command statuses may be performed using a DMA transfer, as understood by one skilled in the art.

To accept a group of queued command statuses, a memory block, or array, starting at a predetermined memory address may be reserved in the host memory 16 of the host computer 12 so that both the adapter 22 and the host computer 14 agree as to where the command statuses will be stored. Once the command statuses are transferred from the adapter 22 to the host computer 12, the adapter 22 provides a pointer to the command statuses 84 in the host computer 12 on the outbound post queue. In an aspect of the invention, the pointer includes the data value corresponding to the number of respective command statuses in the command statuses. In a further aspect, the pointer may include the host memory address of the first command status in the command statuses. After the status pointer is posted, the host computer 12 is then interrupted to fetch the status pointer 86. The host computer 12 responding to the interrupt then reads, starting at the predetermined memory address where the first transferred command is located, the number of command statuses corresponding to the data value in the pointer 88. The host CPU 14 can now read the queued statuses directly from host memory 16 more quickly than having to read statuses across the bus 20 during an ISR.

The host computer 12 may set up its status array in host memory 16 so that the size of the array is at least one entry more than the maximum number of commands supported by a system. For example, if the maximum number of commands supported is 128, and each status entry is 4 bytes long, the array size must be at least 129 times 4 bytes to avoid an overflow condition. In one form, the array size defines the length of a host status queue where the queue of transferred statues is stored. In an aspect of the invention, both the adapter 22 and the host computer 12 recognize the size of the array and that statuses will be stored starting at the starting address of the array and wrap around at the end of the array. Table 3 below illustrates the conventional format used in the outbound post queue according to the I2O standard.

TABLE 3

Conventional Outbound Post Queue

| 2 bytes of status | Command ID | 0X00 |

The format in Table 3 is now stored in the host status queue instead of the outbound queue of the adapter 22 as in the conventional implementation of the I2O standard. Consequently, the outbound post queue of the adapter 22 now contains a status queue pointer having a new format as illustrated in Table 4 below:

TABLE 4

New Status Batching Format

| Lower 3 bytes of the host status queue current address | # of Status entries |

As shown in Table 4, status queue pointer includes the lower 3 bytes of the host status queue current address pointing to the first valid status entry in the host status queue. The number of status entries indicates the number of valid status entries in the host, starting from the current address. Because the host status queue is relatively small, the host computer 12 may allocate the beginning of the host status queue at a 4k boundary. The host computer 12 may not require the upper byte of the address to locate the host status queue. In one form, both the host CPU 14 and the adapter local CPU 26 have a current status queue pointer initialized at a predetermined starting address of the status queue. Therefore, the host computer 12 may not need to read the addressing bytes in the new status batching status format to locate the host status queue current address.

When the host computer 12 fetches the status queue pointer, the host CPU 14 needs to only read the number of status entries in the pointer to be able to read the status commands. Accordingly, starting from the predetermined address, the host CPU 14 increments its current pointer for each status popped out of the host status queue and the adapter local CPU 26 increments its current pointer per each status pushed onto the host status queue.

In a diagram of the relationship among data used in the status batching method, an outbound post queue may include a number of status queue pointers pointing to a host status queue 94. Each of the status queue pointers entries in the outbound post queue may include a three byte address of the host status queue and the number of statuses starting at an indicated address in the host status queue. For example, the first entry in the outbound post queue may indicates that three statuses are located at a first address offset. The host status queue would shows three status and command ID entries starting at the first address offset and continuing for three status address locations in the host status queue. In this manner, multiple statuses can be provided with one status queue pointer entry in the outbound post queue.

To switch from the conventional method of transferring statuses from the adapter 22 to the host computer 12 within an ISR routine, a new mode switch command is provided as illustrated in Table 5 below:

TABLE 5

Status Batching Mode Switch Command

| Offset | Value | Description |
| --- | --- | --- |
| 0X00 | 0XE1 | Op Code |
| 0X01 | Don't Care | Command ID assigned by host |
| 0X02 | 0X00 | Reserved |
| 0X03 | 0X02 | Switched into status batching mode from this point on |
| 0X04–0X07 | 0X00 | Reserved |
| 0X08–0X0B | Queue address | Host status queue starting address, 4 byte aligned |
| 0X0C–0X0D | Queue size | Host status queue sized in unit of bytes |
| 0X0E–0X0F | 0X00 | Reserved |

As understood by a skilled artisan, the mode switch command may be issued by the host CPU 14 before transferring the command statuses from the adapter to, for example, the predetermined status queue memory address in the host computer 12. In a further aspect of the invention, the host 12 insures that the adapter 22 is quiescent before sending the mode switch command with the optional status batching. Once the mode switch command is received by the adapter 22, the adapter local CPU 26 switches into status batching mode for providing batched statuses to the host computer 12.

In yet another aspect, the queue address as shown in Table 5 of the mode switch command may determine the starting address of the host status queue in host memory 16. The adapter 22 may be configured to deliver statuses according to the nature of the status and/or the operating condition of the adapter 22. For example, if the adapter 22 is operating with relatively few commands, or the current status is for a non-disk IO command, such as a configuration type command, the adapter local CPU 26 may transfer the status to the host status queue immediately upon executing the command and post an indication in the outbound post queue and assert an interrupt to the host. Conversely, if the adapter is operating with a relatively large number of commands, the adapter local CPU 26 may queue the statuses in the adapter local memory 28 until a predefined threshold is reached. When the threshold is reached, all statuses queued in the adapter local memory 28 are transferred to the host status queue in host memory 16, for example, using a DMA transfer. A status queue pointer to the number of statuses in the host status queue is posted in the outbound post queue, and an interrupt is then asserted to the host for reading the queued statuses.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method of batching commands between a host computer and an adapter installed on a host computer system bus comprising:
   storing respective command pointers to each of a plurality of commands in an array;
   providing a single array pointer to the array, the array pointer comprising a data value corresponding to a number of respective command pointers in the array;
   delivering the array pointer to the adapter;
   accessing the number of respective command pointers in the command array corresponding to the data value in the array pointer; and
   fetching the commands corresponding to each command pointer accessed.

2. The method of claim 1, wherein the array pointer comprises a starting address of the array in a host computer memory.

3. The method of claim 1, further comprising:
   queuing the plurality of commands as the commands are issued from the host; and posting the array pointer when a predetermined number of commands have been issued by the host.

4. The method of claim 1, further comprising instructing the adapter to read commands in a batch mode.

5. The method of claim 4, further comprising determining if the adapter is in a quiescent state before instructing the adapter to read commands in a batch mode.

6. The method of claim 1, wherein the step of fetching the commands is a direct memory access transfer.

7. A system for batching commands to an adapter installed on a host computer system bus comprising:

a host processor storing respective command pointers to each of a plurality of adapter commands in an array;

establishing a single array pointer to the array, the array pointer comprising a data value corresponding to a number of respective command pointers in the array; and delivering the array pointer to the adapter; and an adapter processor, in communication with the host computer via the system bus, accessing the number of respective command pointers in the command array corresponding to the data value in the array pointer, and fetching the commands corresponding to each command pointer accessed.

* * * * *